(No Model.)
C. W. CRARY.
LATHE CHUCK.
No. 311,962. Patented Feb. 10, 1885.
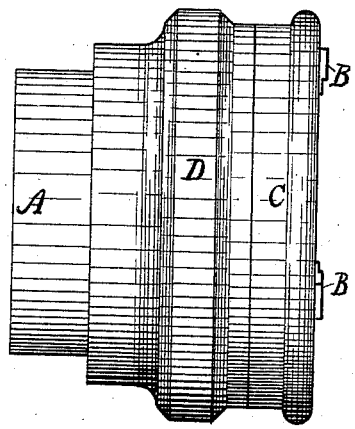
Fig. 1.
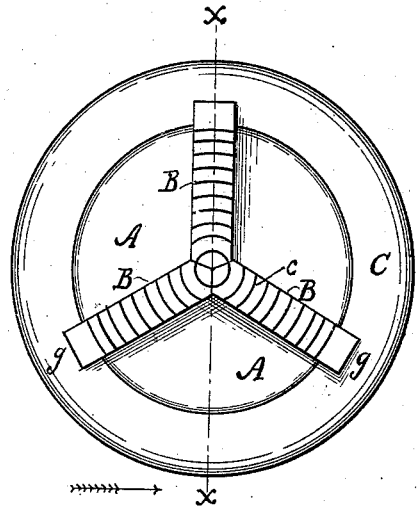
Fig. 2.
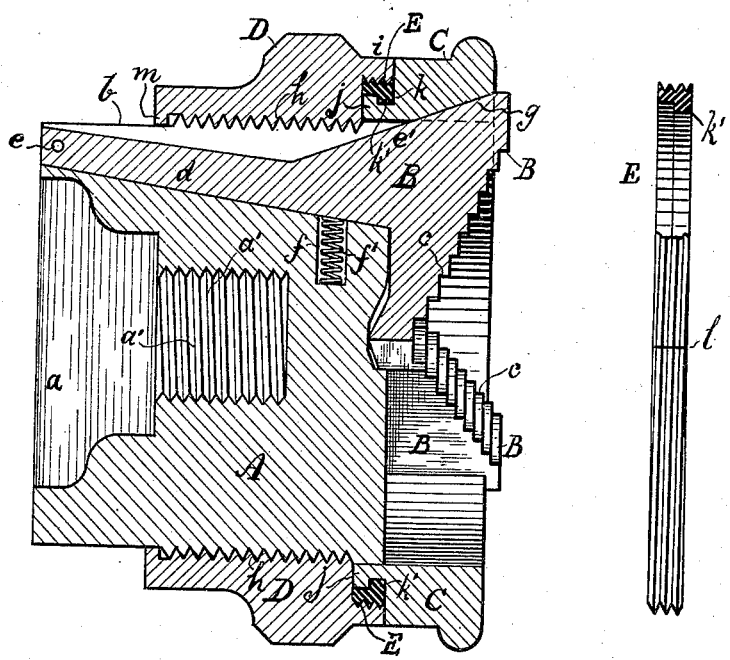
Fig. 3.
Fig. 4.
Witnesses:
J. B. Halpenny.
Inventor:
Cushman W. Crary
per F. F. Warner
his Attorney.

UNITED STATES PATENT OFFICE.

CUSHMAN W. CRARY, OF CHICAGO, ILLINOIS.

LATHE-CHUCK.

SPECIFICATION forming part of Letters Patent No. 311,962, dated February 10, 1885.

Application filed August 25, 1884. (No model.)

*To all whom it may concern:*

Be it known that I, CUSHMAN W. CRARY, residing at Chicago, in the county of Cook and State of Illinois, have invented certain new and useful Improvements in Chucks, of which the following, in connection with the accompanying drawings, is a specification.

In the drawings, Figure 1 is a side view of a chuck embodying my invention. Fig. 2 is a face view of the same. Fig. 3 is a section enlarged in the plane of the line $x\ x$ of Fig. 1; and Fig. 4 is a detail, the same being an edge view of the connecting-ring, a part of which is broken away to more fully show its construction.

Like letters of reference indicate like parts.

A is the body of the chuck, which, with the exceptions hereinafter stated, is a solid piece of metal, cylindrical in form. The rear end of the part A is cut out, as shown at $a$, and $a'$ is a female screw at the inner portion of the socket $a$. By this means the chuck is adapted for attachment to the spindle of the lathe. In the perimeter of the body A, I sink or mill grooves $b\ b$.

B B are the jaws. These jaws have inclined outer ends or faces, which are stepped in concentric circles, as shown at $c\ c$. These jaws have rearward extensions, $d\ d$, which are pivoted at or near their rear ends to the body A, as indicated at $e$, Fig. 3, each jaw being located in a groove, $b$, and fitted neatly therein. The jaws B B are also inclined, as shown at $e'$, and this inclined portion projects radially or laterally as well as forward from the body A, so as to be exposed to contact with a sliding or clamping ring, as will hereinafter be more fully explained. In the body A, I make small pockets $f$, and in each of these pockets are open spiral springs $f'$, bearing outwardly against the jaws B B, respectively.

C is a sliding ring located on the forward end or part of the body A and cut or milled to receive the inclined portions of the jaws B B, as indicated at $g\ g$. As the ring C is moved back the springs $f'$ will cause the jaws B B to move outwardly or toward the perimeter of the body A at their forward ends, the said jaws turning on their pivots $e\ e$, and as the said ring is moved forward the jaws will be moved inwardly or toward each other; but the ring C, as will be perceived, is prevented from being rotated, for the reason that the jaws project into it in the manner already described. By this means articles to be turned or operated upon may be very firmly clasped or clamped by the jaws and released with facility.

D is a ring, screw-threaded on its interior surface, and run upon an exterior screw-thread on the body A, as indicated at $h$, Fig. 3. The forward end of the ring D has a projecting rim or flange, $i$, screw-threaded on its interior surface, and the ring C has a rim or flange, $j$, projecting from it rearwardly; and $k$ is a groove in the outer surface of this flange or rim.

E is a ring, screw-threaded on its outer face and having on its inner face an annular rib, $k'$, adapted to enter the groove $k$. This ring is split transversely, as shown at $l$, Fig. 4, and I apply it to the ring C by expanding it sufficiently to permit it to be arranged on the end thereof, so that the shoulder $k'$ will enter the groove $k$ when the ring is released. In other words, the ring when so arranged and released will spring together and engage the ring C and be capable of being rotated thereon. run the ring D far enough onto the body A to cause its rim $i$ to overlap and engage the outer or screw-threaded surface of the ring E, by which means the rings C and D will be connected to each other in such a manner that the former will be moved back and forth on the jaws B B as the ring D is turned; or the rings C and D may be connected to each other in the manner described before they are arranged upon the body A.

On the rear end of the ring D, I make an annular rib, $m$, having a plain or smooth surface bearing against the plain or smooth surface of the body A, thus shutting out dust and dirt from the screw-threaded surfaces.

In the example illustrated in the drawings I have shown three jaws; but a greater or less number may be employed, although I do not regard the employment of a less number to be expedient.

By pivoting the inner or rear ends of the jaws to the body, and by locating the jaws in the grooves $b\ b$, and fitting them nicely therein, the jaws will move accurately, and retain this accuracy of movement. In other words, after an object has been once centered it may be released and again truly centered by turning the ring D in the proper direction. The jaws retain their true centering position without liability of losing it by the manipulation required for setting and releasing the object to be turned, and the chuck is not liable to become out of order, even by long and frequent use. The chuck is also simple in its construction and operation, and may be made comparatively short.

To use this chuck I place the object to be operated upon between the steps or concentrically-arranged shoulders *c c* on the exposed ends of the jaws B B, so that the center of the object will be approximately near or coincident with the center of the working end of the chuck. For example, the object, if its diameter permits, may be placed between the shoulders second from the outer ends or corners of the jaws, respectively, the jaws being first opened sufficiently for that purpose by running back the ring D. I then clamp the object in the jaws by running the ring D forward until the said shoulders bite firmly upon the object so arranged, when it will be truly centered and ready to be operated upon in the usual manner. In this manner such objects as disks and short cylinders may be operated upon with facility.

I do not here intend to be restricted to the means shown and described for setting and releasing the jaws; but,

Having thus described my invention, what I claim as new, and desire to secure by Letters Patent, is—

1. The combination, substantially as specified, with the body of the chuck, of the jaws B B, pivoted to the said body, and means for setting and releasing the said jaws, for the purposes set forth.

2. The combination, substantially as specified, of the body A, having therein the grooves *b b*, the jaws B B, arranged in the said groove and pivoted to the body at or near their rear ends, and means for setting and releasing the said jaws, for the purposes set forth.

3. The combination, substantially as specified, of the body A, the jaws B B, pivoted to the said body, of springs bearing outwardly against the said jaws, and means for setting the said jaws, for the purposes set forth.

4. The combination, substantially as specified, with the body of a chuck, of the jaws B B, pivoted to the said body, of springs bearing outwardly against the said jaws, of a sliding ring bearing on the said jaws, and of a screw-ring, D, connected to the said sliding ring, for the purposes set forth.

5. The combination of the grooved body A, the pivoted jaws B B, the springs $f' f'$, the sliding ring C, the screw-ring D, and the ring E, all adapted and arranged for operation together, substantially as and for the purposes set forth.

In testimony that I claim the foregoing as my own I hereto affix my signature in presence of two witnesses.

CUSHMAN W. CRARY.

Witnesses:
F. F. WARNER,
J. B. HALPENNY.